April 6, 1926.  1,579,310
L. GRILLET
DEVICE FOR PULVERIZING A MIXTURE OF AIR AND LIQUID FUEL
Filed Jan. 5, 1925
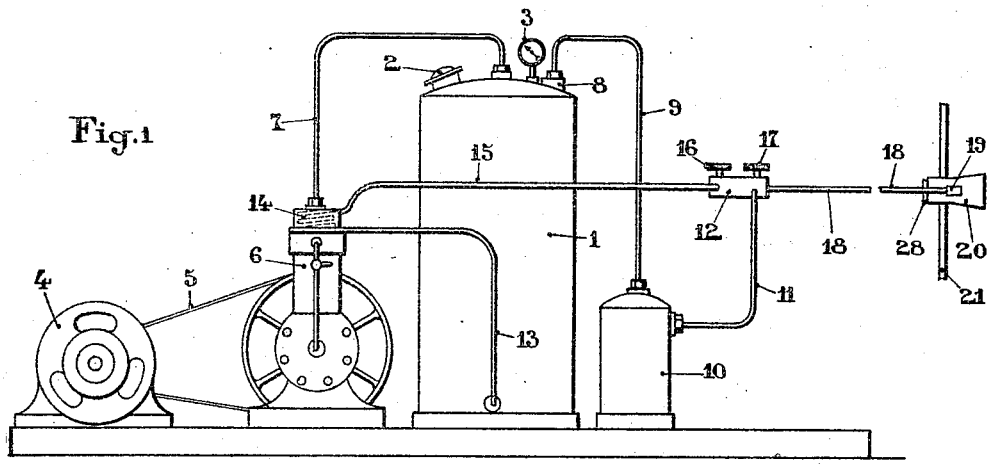
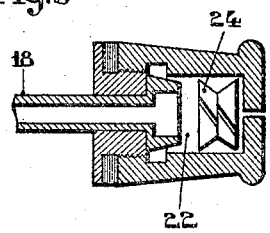
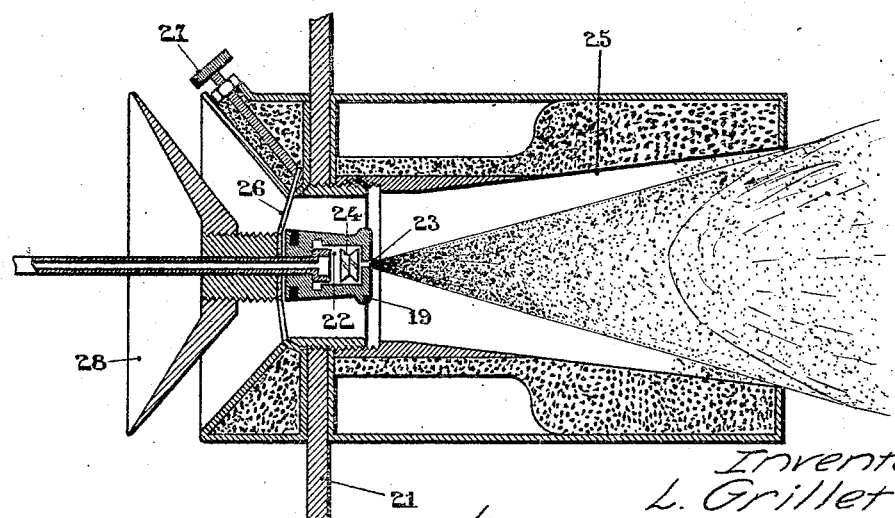
Inventor
L. Grillet Patented Apr. 6, 1926.

1,579,310

UNITED STATES PATENT OFFICE.

LUCIEN GRILLET, OF LAUSANNE, SWITZERLAND.

DEVICE FOR PULVERIZING A MIXTURE OF AIR AND LIQUID FUEL.

Application filed January 5, 1925. Serial No. 738.

*To all whom it may concern:*

Be it known that I, LUCIEN GRILLET, a citizen and resident of Lausanne, Switzerland, have invented a certain new and useful Device for Pulverizing a Mixture of Air and Liquid Fuel (for which I have filed an application in Switzerland dated 21st January, 1924), of which the following is a specification.

The majority of existing installations for heating furnaces by means of liquid fuel are provided with means for the production of fluid under pressure which is supplied to the burner by passages separate from those serving to supply the liquid fuel, the mixing and pulverization being effected in the burner. Installations of this type have the double disadvantage of requiring expensive compression devices and of wearing out the burners by reason of the corrosion due to the intense combustion of the mixture of air and fuel at the outlet from the nozzle itself of the burner.

The present invention has for its subject a method and device for pulverizing a mixture of air and liquid fuel for the purpose of supplying a burner, the arrangement of the device being such that the installation for the production of air under pressure may be considerably reduced by reason of the fact that a low pressure and a small supply of air suffices to ensure the operation of the device. A characteristic feature of the invention resides in the fact that the mixture of fuel and compressed air comes into operation on entering the pulverizer, for example, in a single passage terminating in a pulverizer forming a part of the burner. The gasous mixture is not ignited immediately on leaving the pulverizer by reason of the high speed of the fuel mixture when leaving the nozzle. The flame is formed at a point where the speed of flow of the mixture becomes equal to the speed of propagation of the flame for the combustible mixture under consideration. In this manner the cause for deteriorating the nozzle, referred to above, is eliminated.

In the accompanying drawing there is also illustrated diagrammatically and solely by way of example a form of construction of a device constructed in accordance with the invention and applied to an installation for heating a furnace.

Figure 1 is a diagram of the whole of the pulverizing installation.

Figure 2 shows to a larger scale and in longitudinal section, a detail of the burner, and Figure 3 also shows a longitudinal section and to a still larger scale a detail of the preliminary mixing chamber which constitutes the characteristic feature of the invention.

The installation illustrated comprises a tank 1 enclosing liquid fuel (masout for example). This tank is provided with a filling aperture 2 and a gauge 3 serving to indicate the pressure.

A motor-compressor group of low power suffices to supply the necessary air under pressure. This group comprises a motor 4 (an electric motor of the low power type) connected, for example, by a transmission belt 5, to a small compressor of the vertical piston type similar to that used for inflating pneumatic tyres on automobile vehicles. For an installation of the current type the power of the motor-compressor group is about one-quarter horse-power. The compressed air is passed through a pipe 7 into the masout tank 1 so as to cause this to be compressed into the pipes. From the tank 1 the compressed air passes out through an adjustable safety valve, mounted on the fitting 8, and is conducted by a pipe 9 into an expanding device 10 connected by the pipe 11 to a spraying device 12 for effecting a mixture of air and fuel.

The fuel in the tank 1 passes through the passage 13 into a temperature exchanging device comprising a coil 14 disposed in the casing of the compressor 6, for the purpose of heating the fuel and recuperating the heat which is disengaged in the compressor. The fuel is thus rendered more fluid. From the temperature exchanging device the fuel is conducted by the pipe 15 into the spraying device 12.

The mixture of fuel and compressed air is controlled at the outlet from the spraying device 12 in proportion to the opening of the cock 16 for the fuel and of the cock 17 for the compressed air. The compressed air draws the fuel with it into the single mixing tube 18 of very small internal diameter, (this diameter being of the order of 1½ millimeters). The pipe 18 terminates in a pulverizer 19 forming part of a burner 20 secured in the wall 21 of the furnace to be heated.

The pulverizer 19 consists of a chamber 22 in which terminates the end, which is preferably enlarged, of the pipe 18. The wall of the chamber 22 opposite the pipe 18 is efficiently levelled and its surface is at right angles to the axis of the burner. This wall is provided with an orifice 23, absolutely in the centre, forming the outlet nozzle for the combustible mixture. In the interior of the chamber 22 is disposed a pulverizing cartridge 24 which may be placed against the wall of the chamber or may be disposed at a certain distance from this wall. The cartridge 24 may be cylindrical, but it is preferably of the shape shown in Figures 2 and 3. In these figures it is formed of two truncated cones connected together at their small bases. Its outer diameter is substantially equal to the external diameter of the chamber 22 which it enters without friction and in which it can turn. The two outer faces of the cartridge 24 are made perfectly smooth and at right angles to the axis of the burner. In the surface thereof are provided two or more helicoidal grooves. These two points constitute the two characteristic features of the pulverizing cartridge. This can turn in the interior of the chamber or may be fixed by any suitable means to a suitable point of the said chamber.

The device described is secured to the screw of the nozzle 25 by means of a support 26 held in position by the screw 27. The admission of supplementary air is adjusted by means of a deflector 28. The system operates in the following manner.

When starting the motor 4 the compressor 6 forces air under pressure through the pipe 7 into the fuel tank 1. The liquid fuel under the action of the pressure of the air passes through the pipe 13 into the heat recuperating device 14 and from this into the spraying device 12 which it reaches in a heated condition and consequently in a more fluid condition. The compressed air in excess passes from the tank 1 through the valve 8, along the pipe 9 and after passing through the expansion device 10 it also reaches the spraying device 12 by means of the pipe 11. The cock 17 is first slightly opened and this enables compressed air to pass into the pipe 18. By reason of the vacuum thus produced the air draws with it drops of fuel which also enter the mixing pipe 18 after the cock 16 has been opened. The air and fuel are mixed together in the said pipe 18 and in the chamber are subjected to a particularly efficient mechanical pulverization by the cartridge 24. The air and fuel intimately mixed together pass through the orifice 23 in the form of a jet of fine spray, each particle of air being mixed with a particle of liquid by reason of the passage through the pulverizer. When leaving the nozzle the pressure, although relatively low, is meanwhile sufficient so as to cause the air to considerably increase in volume. This causes the mass of fuel to be divided into extremely fine particles. The gaseous mixture is projected at a high speed through the nozzle 25 into the interior of the furnace where it is ignited by contact with a spark or with a flame producing a long bluish white flame which gives a very intense heat. This flame is generated at a relatively large distance (of the order of 5 to 8 centimeters) from the outlet orifice 23 of the pulverizer. At this point the speed of flow of the fuel mixture is very high. By reason of the increase in volume of the mixture supplied through a very small section at the outlet from the pulverizer, the speed of flow diminishes in proportion to the ejecting cone. The supplementary oxygen necessary for combustion is introduced into the burner in the form of air through an opening 25 at the rear of the burner and its admission may be adjusted by the deflector 28.

The stability of the gaseous mixture is obtained by the adjustment of the cocks 16 and 17 which for this purpose are provided with graduations.

The stopping of the device is effected by stopping the compressor group and by closing the cocks 16 and 17.

The combustion is complete without the evolution of smoke, without leaving any residue and without requiring for this purpose any appreciable excess of air. It presents the maximum of security for continuous operation and it only requires installations of slight importance for the production of air under pressure.

For protecting the walls of the furnace against corrosion by the flame this may be concentrated on a refractory body placed on the grid and forming at the same time a heat accumulator.

It will be understood that the device above described may be applied to all suitable controlling apparatus functioning as a servo-motor and permitting of obtaining automatic operation.

The supply of gaseous mixture depends upon the section of the orifice 23 of the pulverizer 19. For increasing this supply it suffices to enlarge the said orifice by very small proportions.

Having thus described my invention what I claim as new and desire to secure by Letters Patent is:—

1. A heating device for the purpose specified comprising a small air compressor, a heat recuperating device on said compressor, a fuel tank, a pipe leading from the bottom of said tank to said heat recuperating device, a pipe leading from the compressor to the top of the tank, said compressor forcing air under pressure into the tank whereby the fuel is passed into the heat recuperating device, a spraying device, a pipe leading from the heat recuperating device to said spraying device, means connecting said spraying device to the top of the tank, an outlet pipe leading from said spraying device, said outlet pipe being of small diameter, a burner, a pulverizing device in said burner and connected to the said outlet pipe, said pulverizer being adapted to discharge a pulverized mixture of air and fuel into the burner, and adjustable means for supplying supplementary air to said burner.

2. A device for supplying burners for furnaces with liquid fuel comprising a motor, a compressor, means connecting the compressor to the motor, a fuel tank, a delivery pipe connecting the compressor to the fuel tank, an air expansion device, a pipe connecting the top of the fuel tank to the air expansion device, a combined spraying and mixing device, a pipe connecting said combined spraying and mixing device with the air expansion device, a heat recuperating device mounted on the compressor, a pipe leading from the bottom of the fuel tank to said recuperating device, a pipe leading from said recuperating device to said combined spraying and mixing device, means for controlling the passage of fuel and air under pressure into said combined spraying and mixing device, a single outlet pipe of small diameter leading from said combined spraying and mixing device, a pulverizing chamber mounted at the end of said outlet pipe, a pulverizing device inside said chamber, said pulverizing device consisting of two truncated cones having their small bases connected together, said pulverizing device having a plurality of helicoidal grooves therein, said pulverizing chamber having an orifice of small cross section in its wall opposite to the wall connected to the said outlet pipe, a burner member, means for supporting said pulverizing chamber in said burner member and means for adjusting the supply of supplementary air to said burner member.

LUCIEN GRILLET.